(12) United States Patent
Yokoyama

(10) Patent No.: US 8,300,240 B2
(45) Date of Patent: Oct. 30, 2012

(54) APPARATUS AND METHOD FOR CONTROLLING CHANGES TO PRINT SETTINGS

(75) Inventor: Tetsuya Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1556 days.

(21) Appl. No.: 11/397,576

(22) Filed: Apr. 5, 2006

(65) Prior Publication Data
US 2006/0232811 A1 Oct. 19, 2006

(30) Foreign Application Priority Data
Apr. 15, 2005 (JP) ................................. 2005-118976

(51) Int. Cl.
*G06K 15/00* (2006.01)
(52) U.S. Cl. ......... 358/1.14; 358/1.13; 358/1.6; 399/81; 399/82; 399/83; 399/85; 715/744
(58) Field of Classification Search .................. 358/1.14, 358/1.13, 1.15, 1.16, 1.6, 442, 468; 347/5; 399/75, 81, 82, 83, 85; 400/76; 703/24; 710/8, 15; 715/700, 744
See application file for complete search history.

(56) References Cited

U.S. PATENT DOCUMENTS

| | | | | |
|---|---|---|---|---|
| 5,450,571 | A | * | 9/1995 | Rosekrans et al. ............. 703/24 |
| 5,956,471 | A | * | 9/1999 | Ueda et al. ................... 358/1.14 |
| 6,879,408 | B1 | * | 4/2005 | Hori et al. .................... 358/1.13 |
| 6,924,826 | B1 | | 8/2005 | Nakagiri et al. |
| 2001/0006424 | A1 | | 7/2001 | Yokoyama |
| 2002/0186393 | A1 | | 12/2002 | Pochuev et al. ............. 358/1.13 |
| 2003/0072031 | A1 | * | 4/2003 | Kuwata et al. ............... 358/1.15 |
| 2004/0111418 | A1 | * | 6/2004 | Nguyen et al. ................ 707/100 |
| 2004/0111610 | A1 | * | 6/2004 | Slick et al. ..................... 713/160 |

FOREIGN PATENT DOCUMENTS

| | | | |
|---|---|---|---|
| JP | 2001134407 | | 5/2001 |
| JP | 2001134407 A | * | 5/2001 |
| JP | 2002-014667 A | | 1/2002 |
| JP | 2002113906 | | 4/2002 |
| JP | 2002113906 A | * | 4/2002 |
| JP | 2003-44245 | | 2/2003 |
| JP | 2004-054656 | | 2/2004 |
| JP | 2004192219 A | * | 7/2004 |

OTHER PUBLICATIONS

U.S. Appl. No. 11/441,025 (Yokoyama), filed May 26, 2006.
Japanese Office Action dated Jul. 24, 2009 in Counterpart Application No. 2005-118976.
Japanese Office Action dated Jan. 5, 2010 concerning Japanese Patent Application No. 2005-118976.

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

An image processing apparatus receives a job, analyzes the received job, generates a saved job that includes an image and output settings information and saves the generated saved job in a storage unit. The saved job that has been saved in the storage unit is output in response to a prescribed output operation. The image processing apparatus acquires a restriction on processing at the time of output and incorporates restriction information, which is indicative of the acquired restriction, in the output settings information. Processing for outputting such a saved job is restricted based upon the restriction information contained in the output settings information.

6 Claims, 18 Drawing Sheets

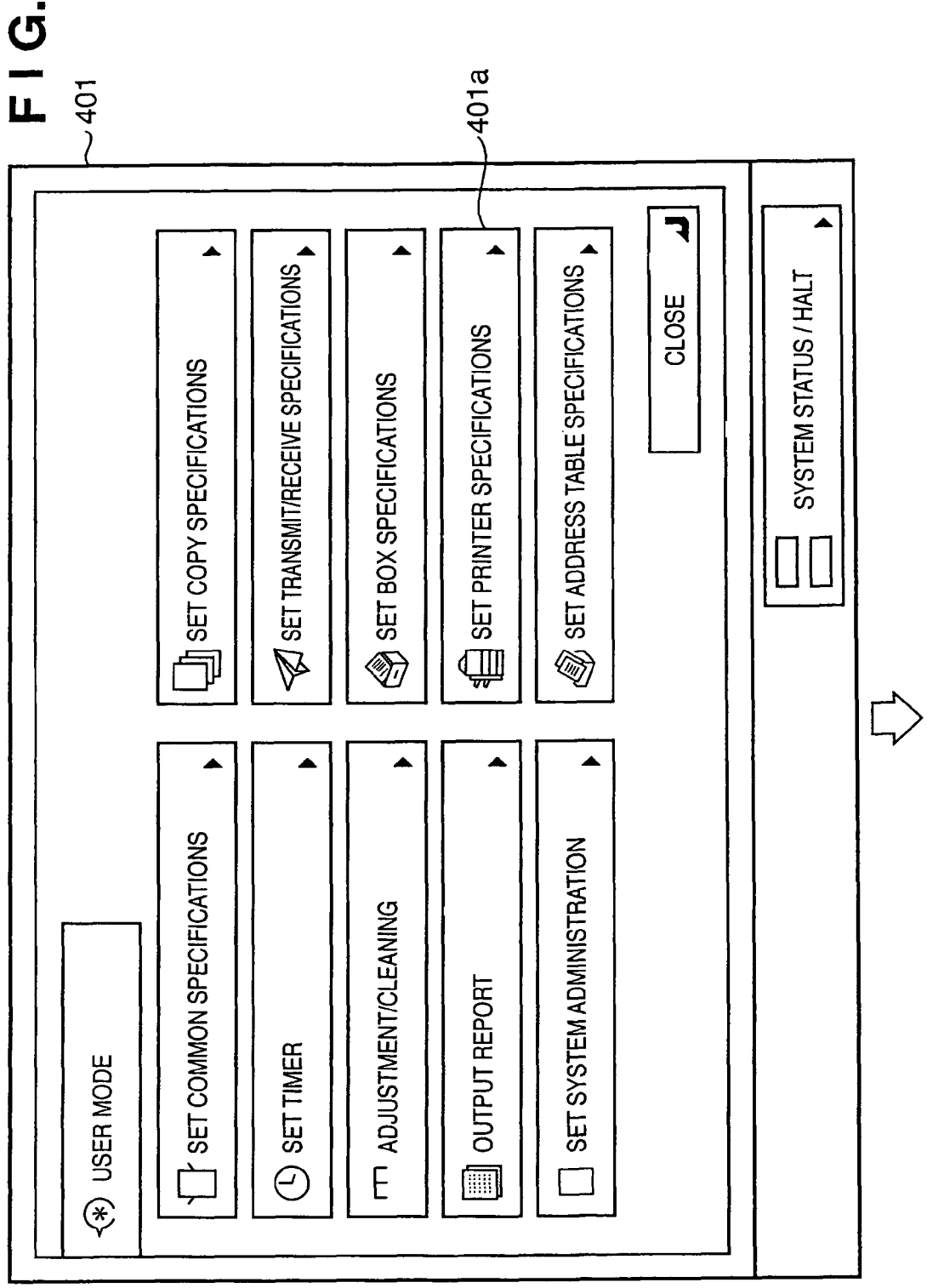

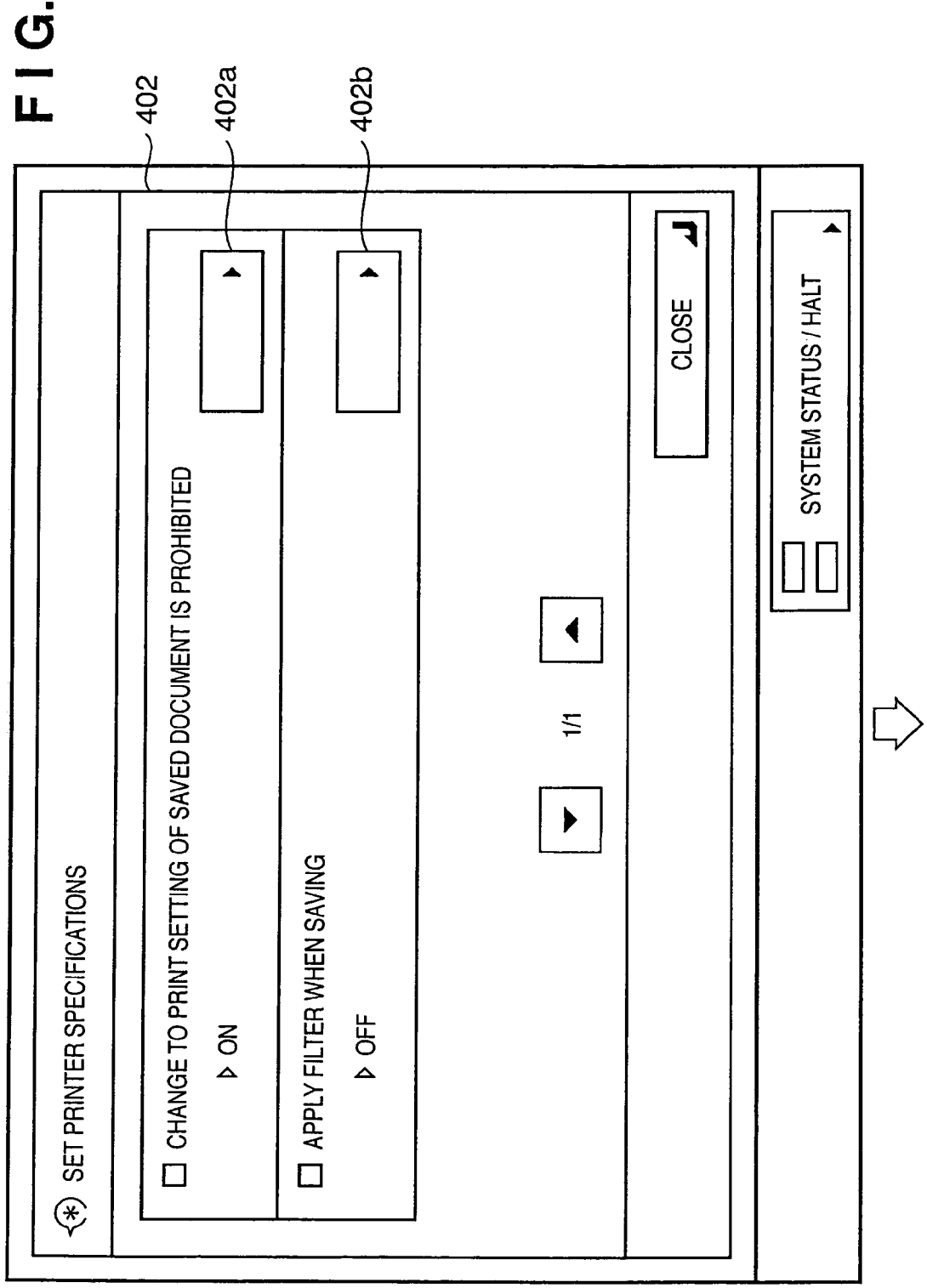

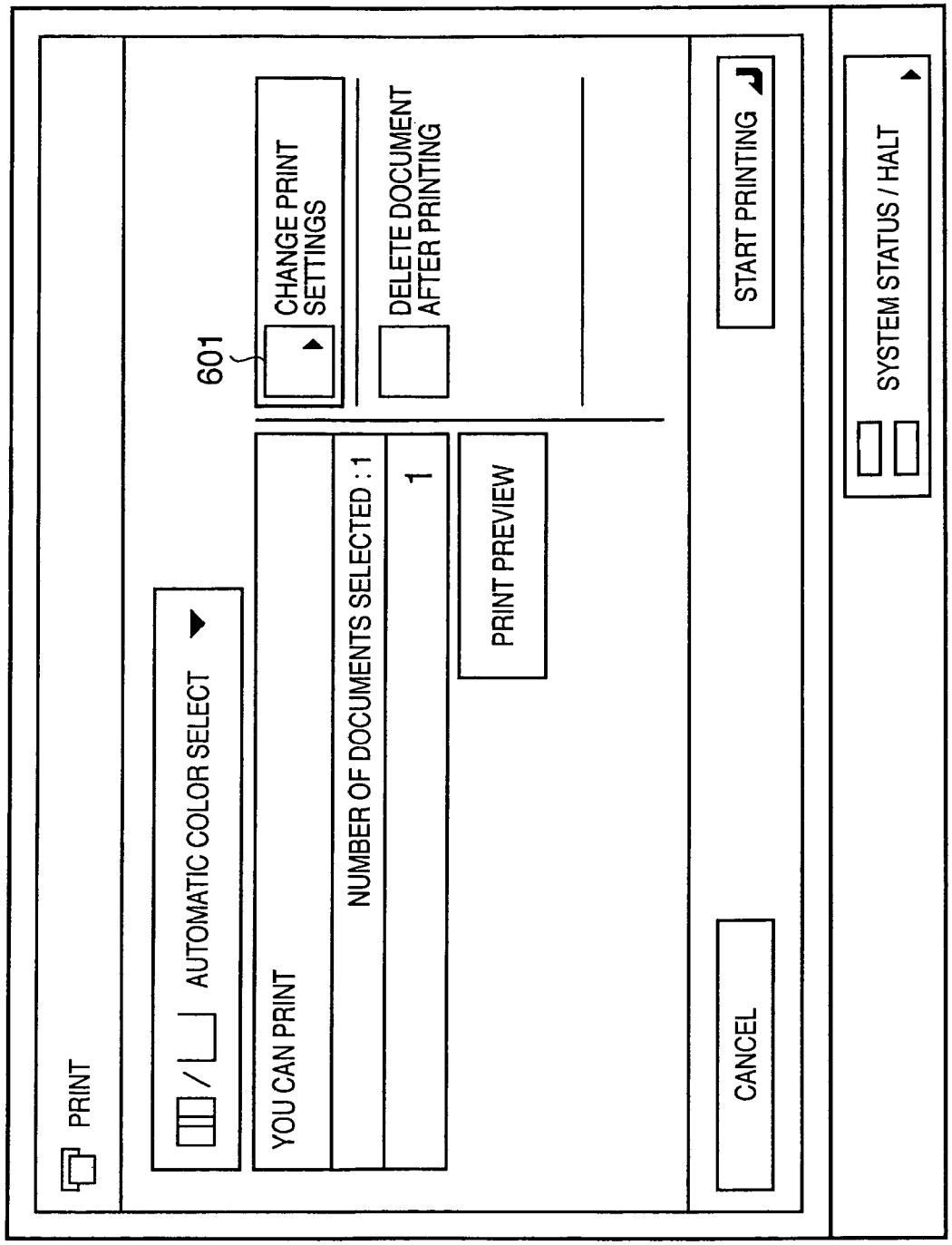

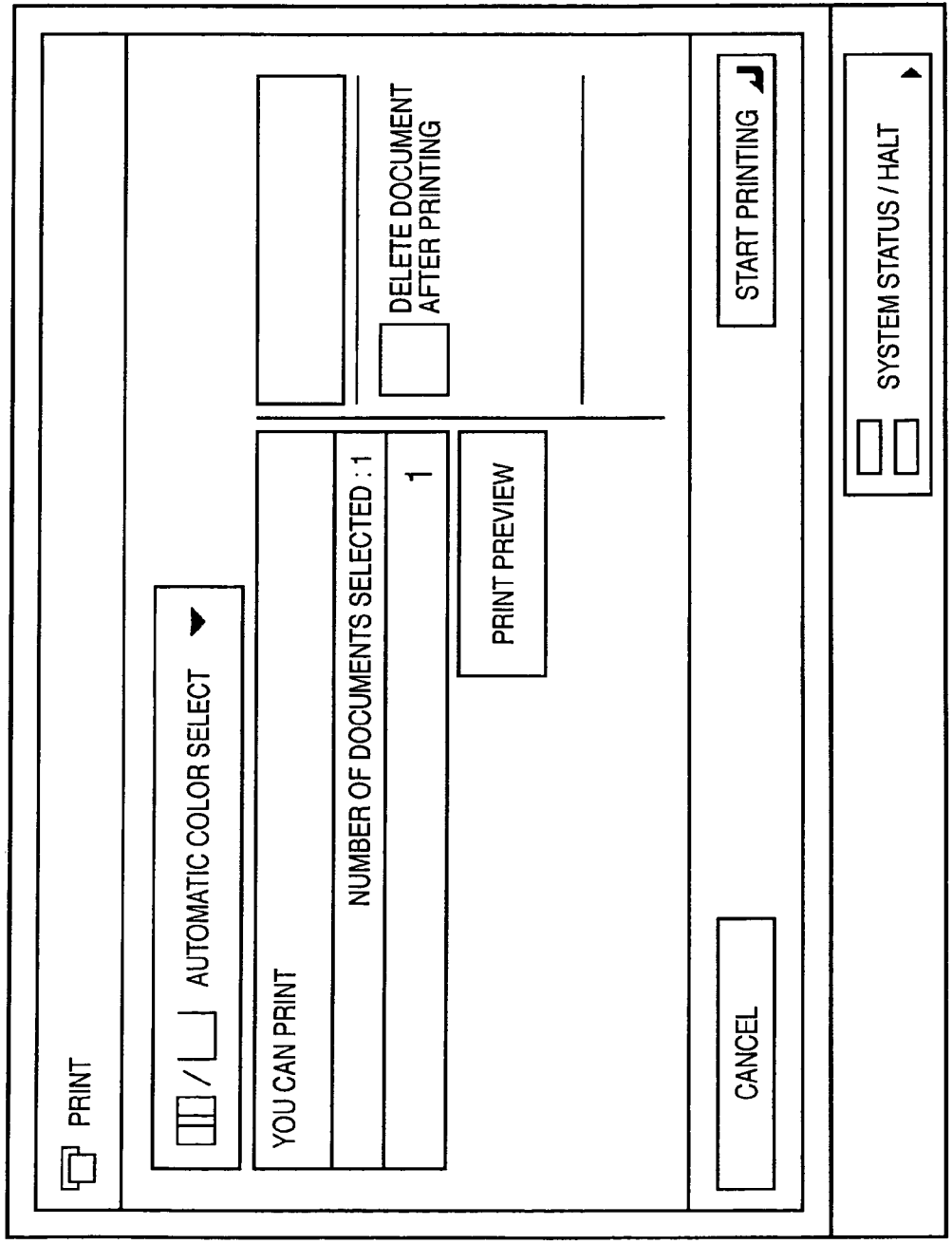

FIG. 11

SAVED-JOB PROHIBITED OPERATIONS  1101

☐ PROHIBIT PRINTING

☑ PROHIBIT CHANGE OF PRINT SETTINGS

☐ PROHIBIT TRANSMISSION

☐ PROHIBIT APPLICATION OF FILTER WHEN SAVING

[ OK ]   [ CANCEL ]

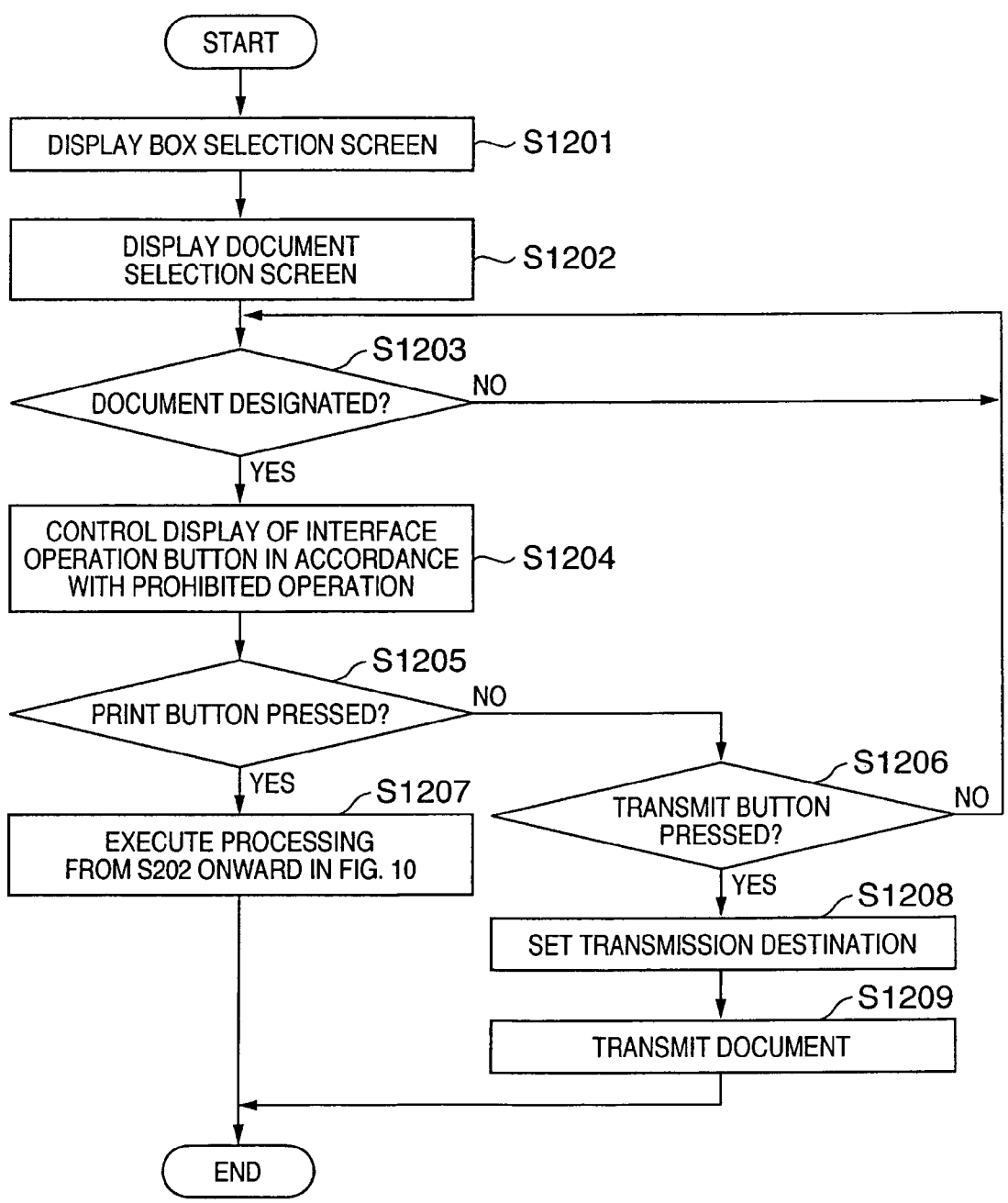

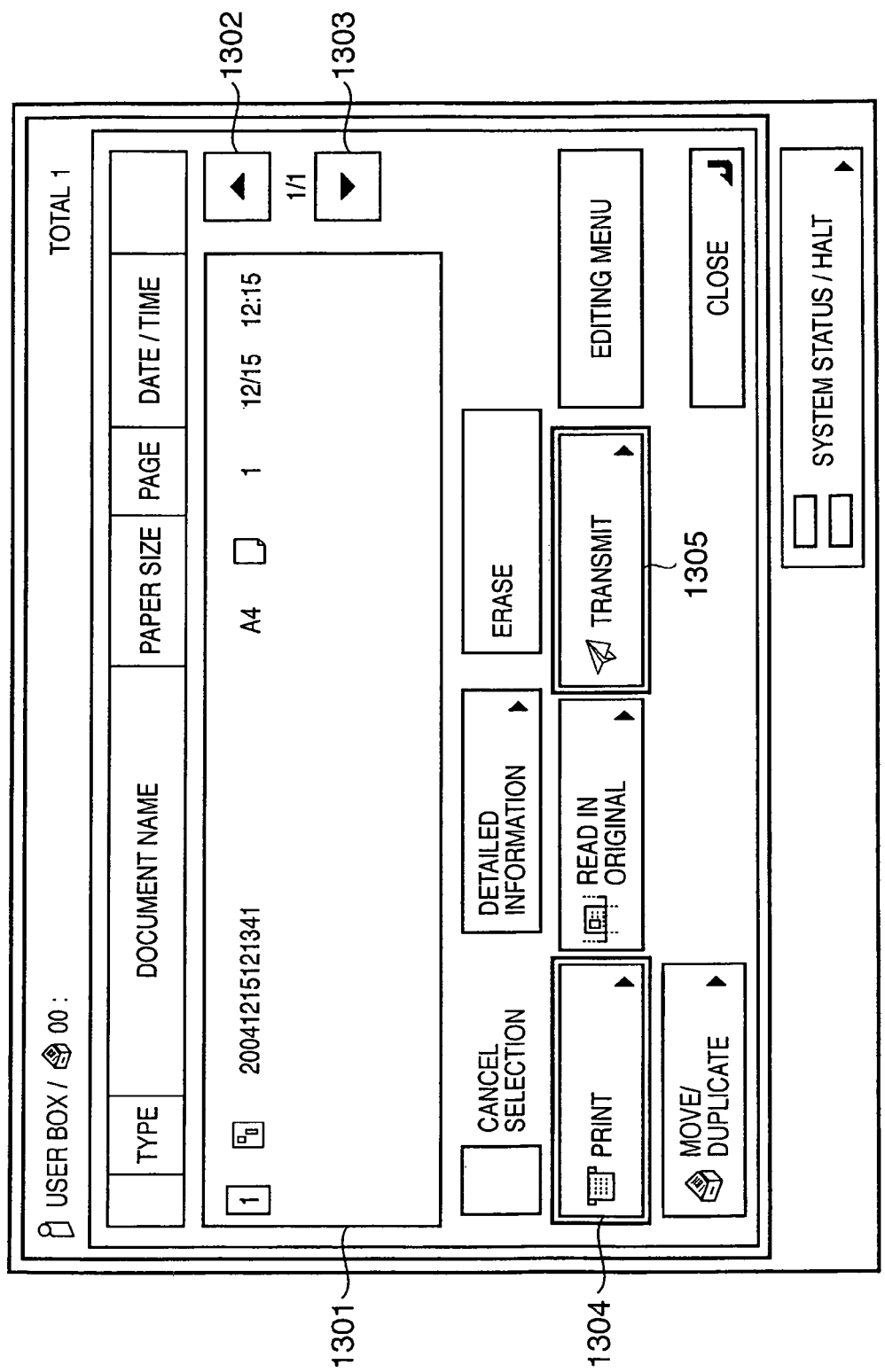

APPARATUS AND METHOD FOR CONTROLLING CHANGES TO PRINT SETTINGS

FIELD OF THE INVENTION

This invention relates to an image processing apparatus in which a received job is saved inside a device and processing for outputting the job is capable of being executed as necessary.

BACKGROUND OF THE INVENTION

An image processing apparatus that has been proposed (see the specification of Japanese Patent Application Laid-Open No. 2003-44245) has a filtering function. When a job is created and printed by a client device, the filtering function filters the job and is capable of changing the state of the job on the side of an image processing apparatus. Further, an image processing apparatus having a function (referred to as a "box function") according to which a received job is not printed immediately but is saved in a storage area of an image processing apparatus has been realized. With the box function, an image read from a scanner, an image received by facsimile and an image obtained by expanding a print job from a client device can be stored on a hard disk or the like as a saved job. A saved job stored by the box function can be output by user operation performed at a user interface provided on an image processing apparatus. Further, the box function is such that when a saved job is output, it is possible to make an output setting different from that which prevailed when the job was generated by a client device (see the specification of Japanese Patent Application Laid-Open No. 2004-54656).

Thus, in a case where a job received by an image processing apparatus is a job saved by a box function, the settings can be changed on the side of the image processing apparatus when the saved job is output. If a job for which the settings have been changed by application of a filtering function has been saved by the box function, therefore, the job settings can be changed using a user interface on the image processing apparatus when the job is output. A problem which arises is that even in a case where an administrator has so arranged it by use of a filtering function that a print job is always printed on both sides of paper as for the purpose of reducing expenses, for example, the settings of a job saved by the box function can be changed to single-sided printing using the user interface on the image processing apparatus.

This problem is not limited to the filtering function. For example, in a case where a job that has been created by a certain user and saved by the box function of an image processing apparatus is printed with different settings by another user using the image processing apparatus, there is a possibility that the result of the printout will be different from the intent of the user who generated the job.

Further, in a case where a setting for printing an image in a 2-in-1 format (a state in which images of two pages are arranged side by side on a single sheet of paper) has been made by the filtering function, the images saved by the box function become images in the 2-in-1 format. If it is attempted to output (as by printing or fax transmission, etc.) such a saved job in a form in which the images are arranged on one page each, it is possible to enlarge the images by a setting made at the image processing apparatus and place one image on one page. In such case, however, images that have been reduced in size are enlarged. As a consequence, a decline in image quality is unavoidable and, depending upon the application of the saved job, a hindrance can result.

SUMMARY OF THE INVENTION

Accordingly, an object of the present invention is to make it possible to impose a restriction upon processing of a saved job (namely processing when the job is saved and/or output) and to so arrange it that an output in line with the intentions of the user can be realized when a saved job is output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C are diagrams illustrating an example of a user interface, which is presented on an MFP according to the embodiment, for setting whether or not to allow a change in the print settings of a saved job and whether or not to apply a filter when a job is saved;

FIGS. 6A and 6B are diagrams illustrating an example of setting screens displayed when a saved document is printed in an MFP according to the first embodiment;

FIG. 11 is a diagram illustrating an example of a saved-job prohibited-operation dialog box displayed on a client device according to a second embodiment of the present invention when a PDL job is introduced;

FIG. 12 is a flowchart useful in describing processing for printing a saved document in an MFP according to the second embodiment; and FIGS. 13A to 13C are diagrams illustrating an example of an operation screen displayed when a saved document is processed in an MFP according to the second embodiment.

DETAILED DESCRIPTION OF THE PREFERRED EMBODIMENTS

Preferred embodiments of the present invention will now be described in detail in accordance with the accompanying drawings.

First Embodiment

Figure 1:
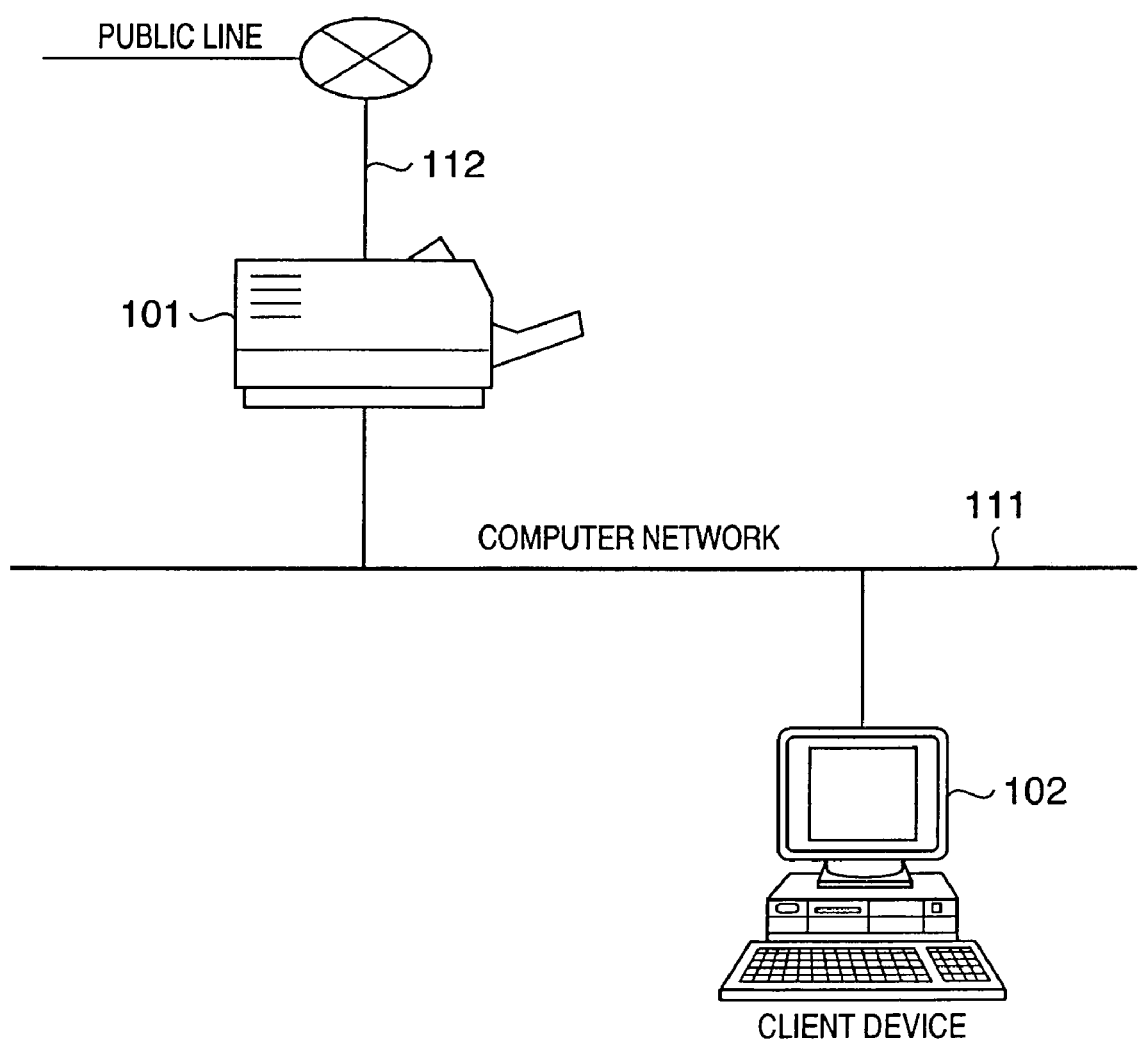
FIG. 1 is a block diagram illustrating an example of the hardware configuration of a system according to a first embodiment of the present invention.

FIG. 1 is a block diagram illustrating the configuration of a system constructed on a computer network 111 inclusive of an MFP to which an image processing apparatus according to a first embodiment is applied. In this embodiment, a PDL job is generated at a client device 102 and transmitted to an MFP 101. The MFP 101 receives the PDL job transmitted from the client device 102 and executes processing such as printout or saving of the job in an external storage unit. The function for saving the received PDL job in the external storage unit is referred to as a "box function". The box function is such that when the PDL job is saved, image data obtained by expanding the job into an image is saved.

Figure 2:
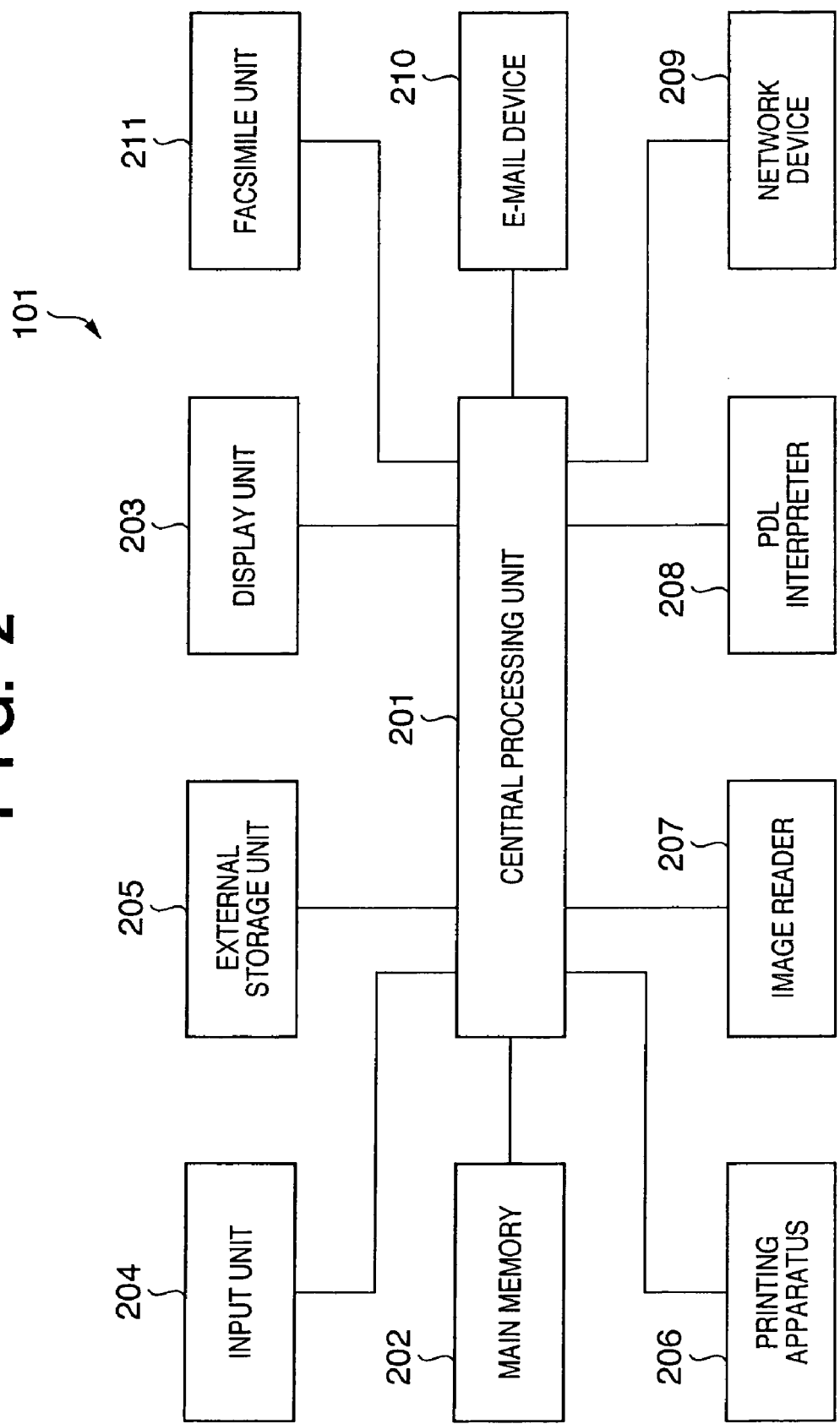
FIG. 2 is a block diagram illustrating an example of the hardware configuration of a multifunction peripheral (MFP) according to the embodiment of the present invention.

FIG. 2 is a block diagram illustrating the hardware configuration of the MFP 101, which functions as the image processing apparatus of this embodiment. The MFP 101 comprises a central processing unit 201, a main memory 202, a display unit 203, an input unit 204, an external storage unit 205, a printing apparatus 206, an image reader 207, a PDL interpreter 208, a network device 209, an e-mail device 210 and a facsimile unit 211.

The central processing unit 201 controls the main memory 202, display unit 203, input unit 204, external storage unit 205, printing apparatus 206, image reader 207, network device 209, e-mail device 210 and facsimile unit 211 and executes the four arithmetical operations and logical operations. The main memory 202 stores information necessary in order for the MFP 101 to execute various information processing. This information is read by the central processing unit 201 as necessary. The display unit 203, which displays the results of processing, such as figures and characters, comprises a CRT or LCD. The input unit 204, which is for making various inputs to the central processing unit 201, comprises a keyboard and mouse, a card reader or a touch-sensitive panel, etc. In a case where a touch-sensitive panel is employed as the input unit 204, the touch-sensitive panel is provided on the display screen of the display unit 203 and cooperates with the display unit 203 to provide a user interface.

The external storage unit 205 stores various information and is a magnetic or magneto-optical store device. The external storage unit 205 is used in the saving of a PDL job by a box function. It is assumed in this embodiment that a magnetic storage device is used in order to implement the box function. Further, the magnetic storage device is provided with a document storage area and, as described later, it is possible to save a document as the result of processing executed by the PDL interpreter 208. The PDL interpreter 208 in the MFP 101 of this embodiment converts a received PDL job into image data and extracts various settings. The image data obtained by the conversion and the extracted settings information are saved in the document storage area as a saved document.

The printing apparatus 206 prints the results of processing, such as figures or characters, on a recording medium such as paper. The image reader 207 reads a paper document optically and converts it to electronic information. The PDL interpreter 208 converts the PDL job to an image format capable of being handled by the image processing apparatus, extracts print settings contained in the PDL job and stores these in a document management area together with the image as a document. The PDL interpreter 208 is further equipped with a filtering function for changing the state of a PDL job.

The network device 209 connects the computer network 111 with the MFP 101. In this embodiment, a PDL job from the client device 102 is received by the network device 209 via the computer network 111. The e-mail device 210 sends and receives e-mail to and from external equipment through the computer network 111. The facsimile unit 211 is connected to a public line 112 (FIG. 1) and is capable of sending and receiving documents to and from external equipment by facsimile.

Figure 3:
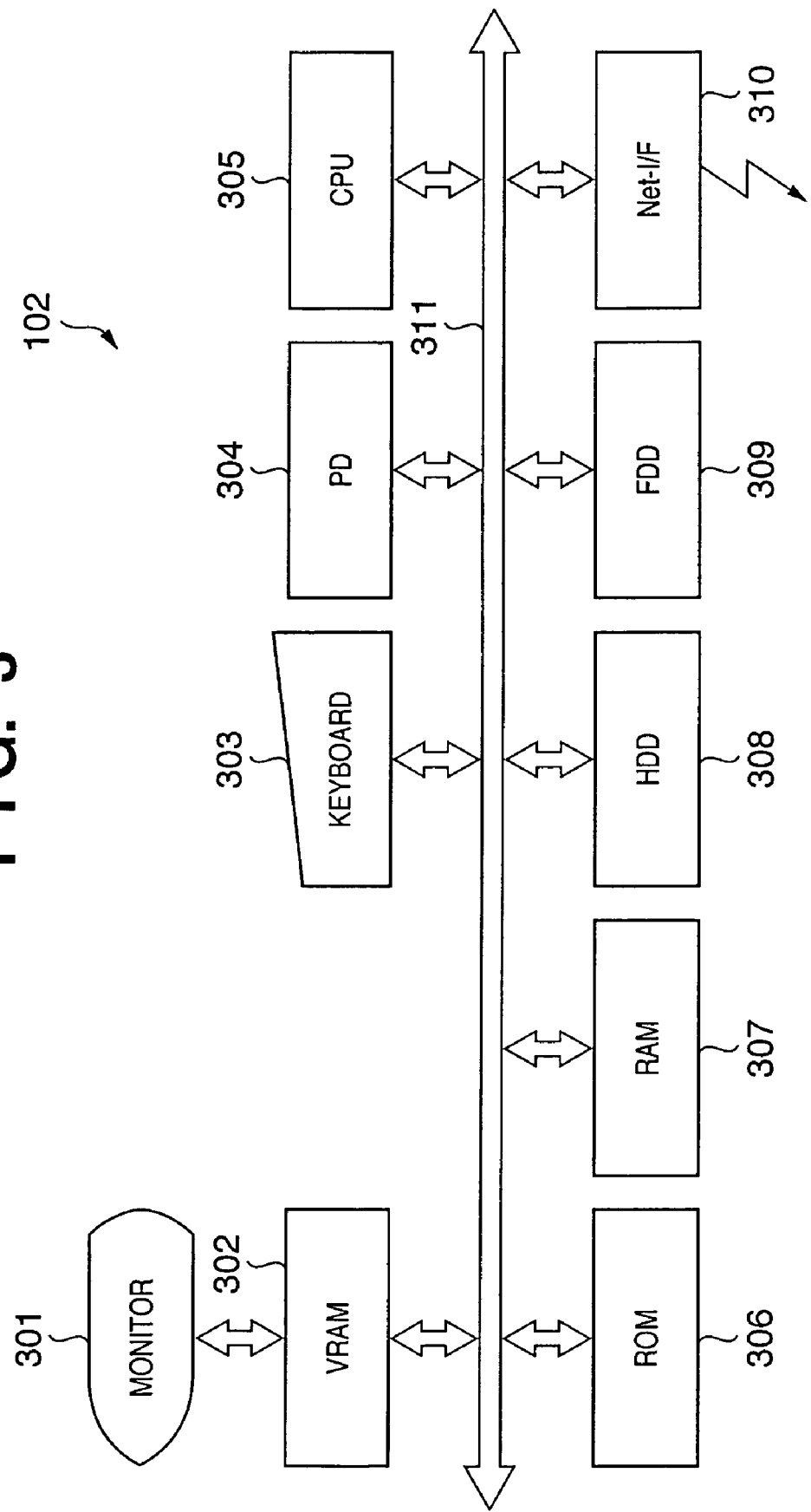
FIG. 3 is a block diagram illustrating an example of the hardware configuration of a client apparatus according to the embodiment of the present invention.

FIG. 3 is a block diagram for describing the structure of the client device 102. A monitor 301 displays information concerning data currently being processed by an application program, as well as various message menus. The monitor 301 comprises a CRT or LCD, etc. A VRAM 302 is a video RAM for expanding an image displayed on the screen of the monitor 301. A keyboard 303 and pointing device 304 are used to enter characters in prescribed fields on a screen and to designate icons and buttons of a GUI. A CPU 305 exercises control of the overall apparatus.

A ROM 306 stores the operation processing procedure (program) of the CPU 305. It should be noted that the ROM 306 stores application programs and error processing programs relating to data processing, as well as programs relating to flowcharts described later. A RAM 307 is used as a work area when the various programs mentioned above are executed by the CPU 305 and as a temporary save area when error processing is executed. It should be noted that a control program that has been installed in a hard-disk drive (HDD) 308 or the like is loaded in the RAM 307 as necessary and is executed by the CPU 305.

The HDD 308 and a floppy (registered trademark)-disk drive (FDD) 309 are used to store and read application programs, data and libraries, etc. Further, an optical (magnetic) disk drive such as a CD-ROM, MO or DVD or a magnetic-tape drive such as a tape streamer or DDS may be provided instead of or in addition to the FDD 309.

A network interface 310 connects the apparatus to a network. A system bus 311, which comprises an address bus, data bus and control bus, interconnects the above-mentioned units.

Figure 4C:
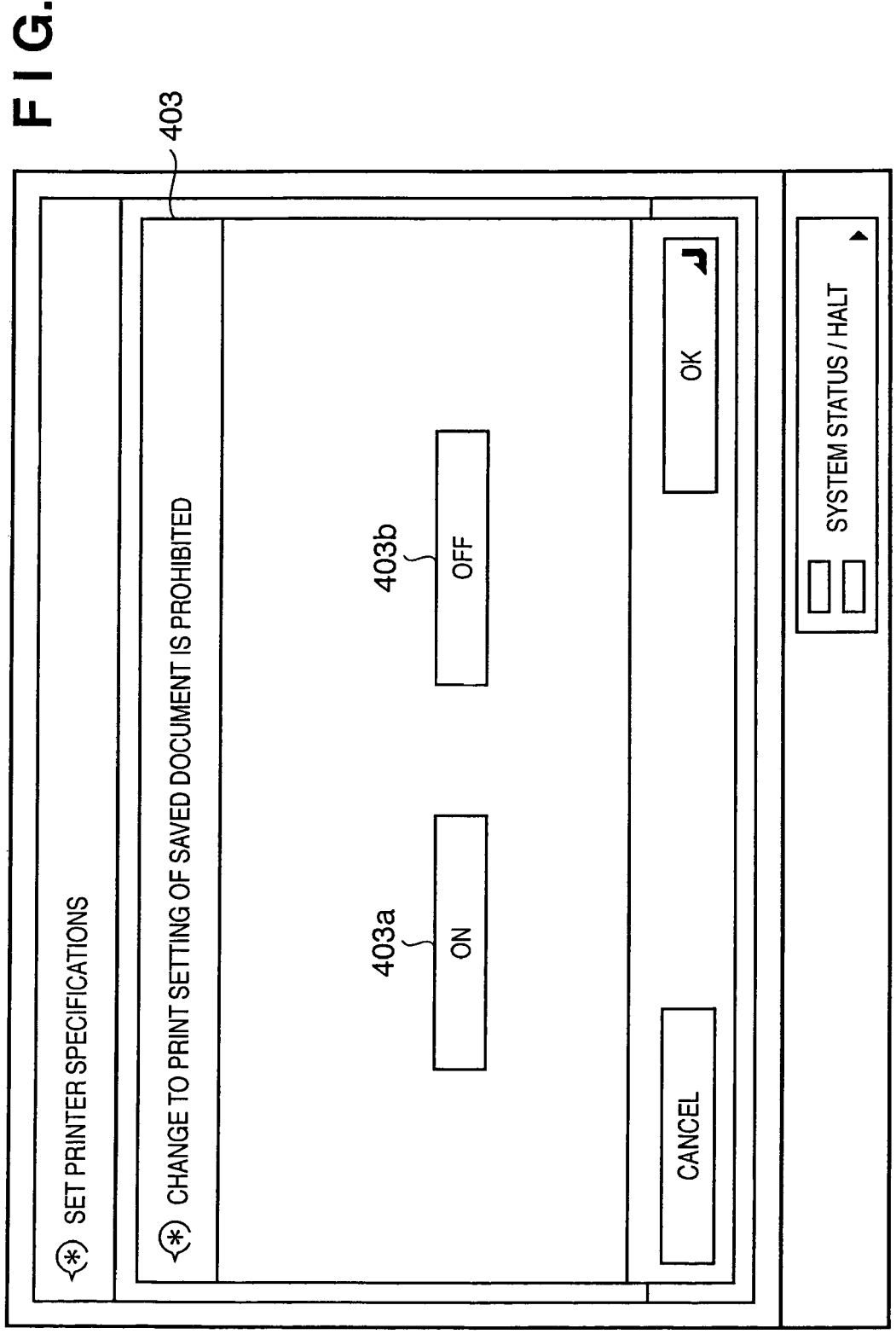

FIGS. 4A to 4C are diagrams illustrating a user interface for setting restrictions on processing when save processing based upon a box function is executed and restrictions on processing when a saved document is output in the image processing apparatus (MFP 101) according to the first embodiment. The user interface is implemented by cooperation between the touch-sensitive panel of the input unit 204 and the display unit 203. With this user interface, whether or not a filtering function is applied can be set as a restriction imposed when save processing based upon a box function is executed. Further, a setting for prohibiting a change of print setting from the MFP 101 can be performed as a restriction imposed when a saved document is output.

A setting relating to a PDL job can be made using the user interface illustrated in FIGS. 4A to 4C. A menu 401 is displayed on the display unit 203 by a prescribed operation (FIG. 4A). If a printer specification setting button 401a is selected, a printer specification setting screen 402 is displayed on the display unit 203 (FIG. 4B). If a button 402a on the printer specification setting screen 402 is pressed, a screen 403 (FIG. 4C) for setting whether "CHANGE TO PRINT SETTING OF SAVED DOCUMENT IS PROHIBITED" should be turned ON or OFF is displayed. That is, by using the screen 403 for setting a prohibition on a change in print settings, whether a change in print settings of a saved document is to be prohibited or not can be set when a PDL job is made a saved document. In this embodiment, an ON button 403a is selected if a change in print settings is to be prohibited, and an OFF button 403b is selected if the change is to be permitted. More specifically, a change in the print settings of a saved document is prohibited by turning "CHANGE TO PRINT SETTING OF SAVED DOCUMENT IS PROHIBITED" ON, and a change in the print settings of a saved document is permitted by turning "CHANGE TO PRINT SETTING OF SAVED DOCUMENT IS PROHIBITED" OFF.

Similarly, if a button 402b on the printer specification setting screen 402 is pressed, a screen (not shown) for setting whether "APPLY FILTER WHEN SAVING" should be turned ON or OFF is displayed. The screen for setting "APPLY FILTER WHEN SAVING" also has ON and OFF switches in a manner similar to that of the screen 403. If "APPLY FILTER WHEN SAVING" is set to ON, the filtering function is applied and expansion into image data is performed in PDL-job save processing. Further, if "APPLY FILTER WHEN SAVING" is set to OFF, an expansion into image data is performed without applying the filtering function in PDL-Job save processing.

Figure 5:
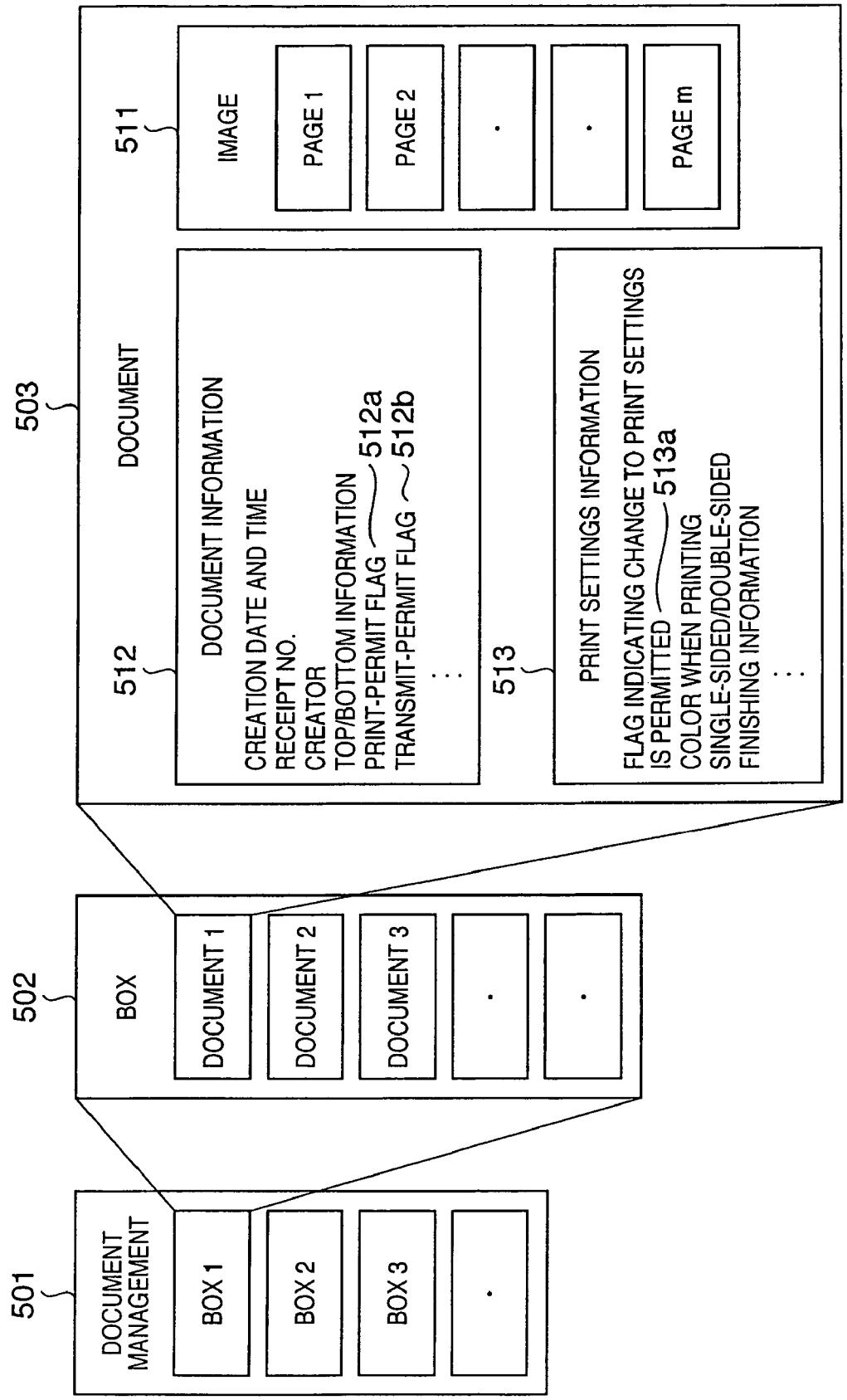
FIG. 5 is a diagram useful in describing the structure of a document management area provided in an external storage unit of an MFP according to the embodiment.

FIG. 5 is a diagram illustrating the structure of a document management area 501 placed in the external storage unit 205 in order to implement the box function according to this embodiment. As shown in FIG. 5, a plurality of boxes are registered in the document management area 501. Each box is capable of storing a plurality of saved documents, as typified by a box 502. A user selects a desired document from a desired box and can print out and transmit the document. As illustrated by a document 503, each saved document includes images 511 of one or multiple pages, document information 512 and print settings information 513. The document information 512 contains document-related information such as creation date and time, a per-document number (receipt number), creator name, image top-bottom information and number of pages, etc. The print settings information 513 contains printing-related information such as a flag indicating that a change to print settings is permitted (a flag indicating the set status of "CHANGE TO PRINT SETTING OF SAVED DOCUMENT IS PROHIBITED" based upon the above-mentioned screen 403), color when printing, single/doubled-sided print setting and finishing information, etc.

FIGS. 6A and 6B are diagrams illustrating an example of setting screens displayed when a document (saved document) saved in the external storage unit 205 by the box function is printed in the MFP 101 of this embodiment. FIG. 6A illustrates an example of a setting screen in a case where it is possible to change a print setting (i.e., a case where "CHANGE TO PRINT SETTING OF SAVED DOCUMENT IS PROHIBITED" is OFF). By pressing a print-settings change button 601, the print settings regarding the selected document can be changed. FIG. 6B illustrates an example of a setting screen in a case where a change to print settings is not permitted (i.e., a case where "CHANGE TO PRINT SETTING OF SAVED DOCUMENT IS PROHIBITED" is ON). The print-settings change button 601 is not displayed on the screen of FIG. 6B.

Figure 7:
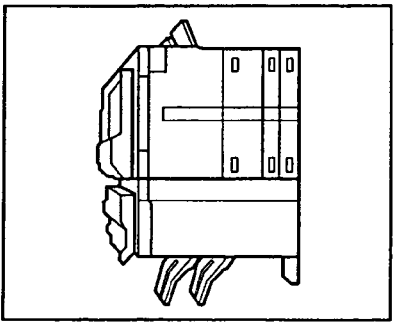
FIG. 7 is a diagram illustrating an example of display of a device settings dialog box displayed on a client device according to the first embodiment when MFP device information is acquired.
Figure 8:
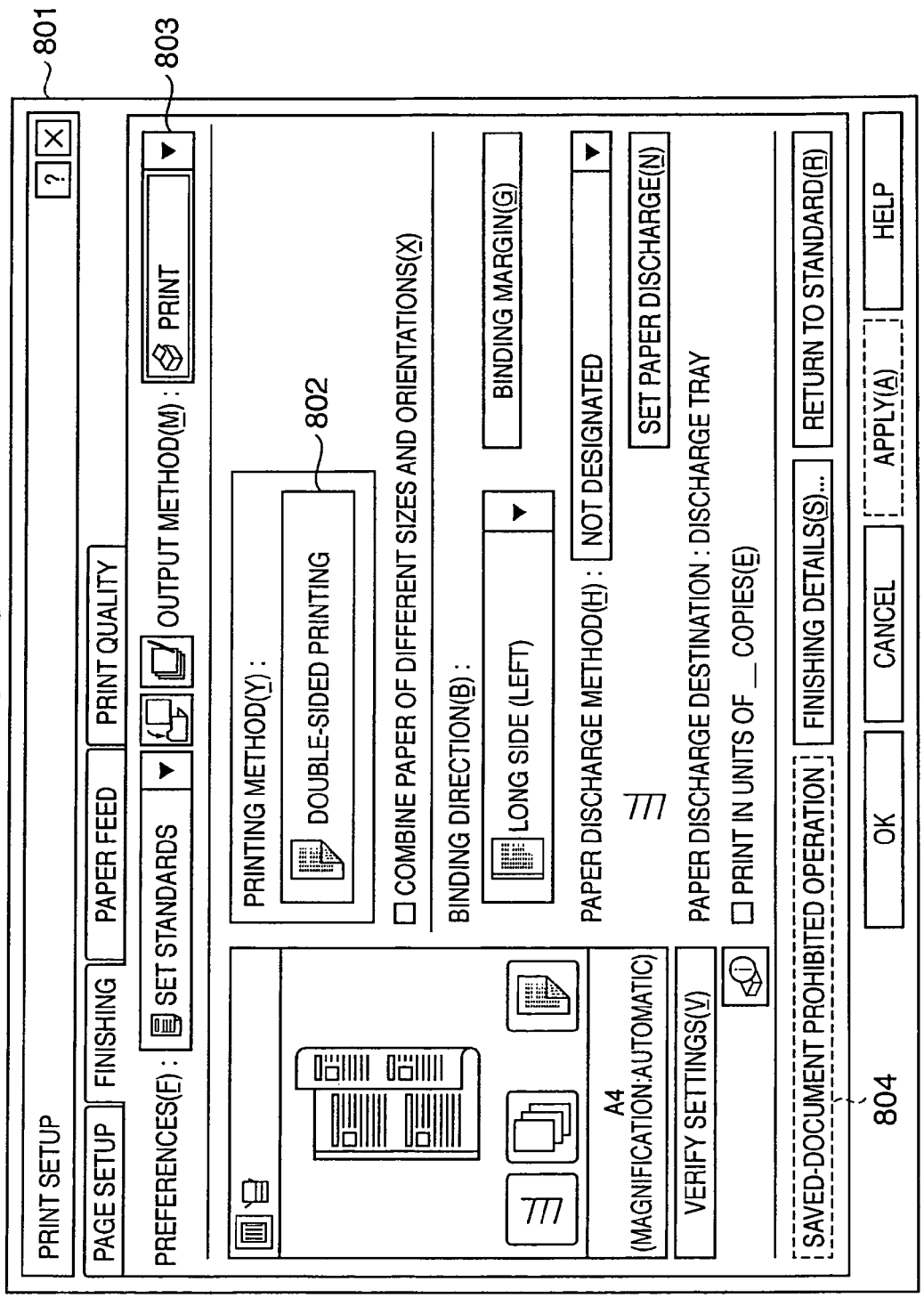
FIG. 8 is a diagram illustrating an example of display of a print settings dialog box displayed on a client device according to the first embodiment when a PDL job is introduced to an MFP.

FIG. 7 is a diagram illustrating an example of settings dialog box 701 displayed on the monitor 301 when device information concerning the MFP 101 is acquired in the client device 102. If a device-information acquire button 702 in the dialog box 701 is pressed (e.g., clicked), the client device 102 acquires device information concerning the MFP 101 using the SNMP (Simple Network Management Protocol). FIG. 8 is a diagram illustrating an example of display of a print settings dialog box 801 displayed on the monitor 301 of the client device 102 when a PDL job is introduced to the MFP 101 from the client device 102. This dialog box is such that the items that are capable of being set change depending upon the device information.

Before a PDL job is introduced to the MFP 101, the client device 102 acquires the device information of the MFP 101. This is carried out in response to the user pressing the device-information acquire button 702 in the settings dialog box 701 displayed on the side of the client device 102 in FIG. 7.

Next, the user specifies printing from within an application running on the client device 102, whereupon a driver program for the MFP 101 is launched. The driver program presents the print settings dialog box 801 of FIG. 8 and makes it possible for the user to designate a desired print setting using this dialog box. The user can also designate the introduction of a PDL job to the MFP 101 from a prescribed screen (not shown) of the driver program. It is so arranged that a setting prohibited by the MFP 101 cannot be selected on the print setting screen of FIG. 8. For example, this embodiment is such that a filtering function that forcibly makes the print setting of a PDL job a double-sided print setting is set in the PDL interpreter 208 of the MFP 101. This means that the setting of the printing method in the print settings dialog box makes possible the selection only of double-sided printing; other selections are prohibited. According to the display example shown in FIG. 8, a button that displays a list of selections is not displayed in a "PRINTING METHOD" section 802 and therefore a selection other than double-sided printing cannot be made. Further, in an "OUTPUT SELECTION METHOD" section 803, "PRINT" and "BOX SAVE" (saving of a job by the box function) can be selected as the output method. It should be noted that "SETTINGS PROHIBITED BY MFP 101" for the above-described display control are acquired by pressing the device-information acquire button 702 of FIG. 7. However, it may be so arranged that this is acquired from the MFP 101 automatically when the screen of FIG. 8 is displayed.

Described next will be processing for saving and printing a job by the box function of this embodiment having the structure and user interface set forth above.

Figure 9:
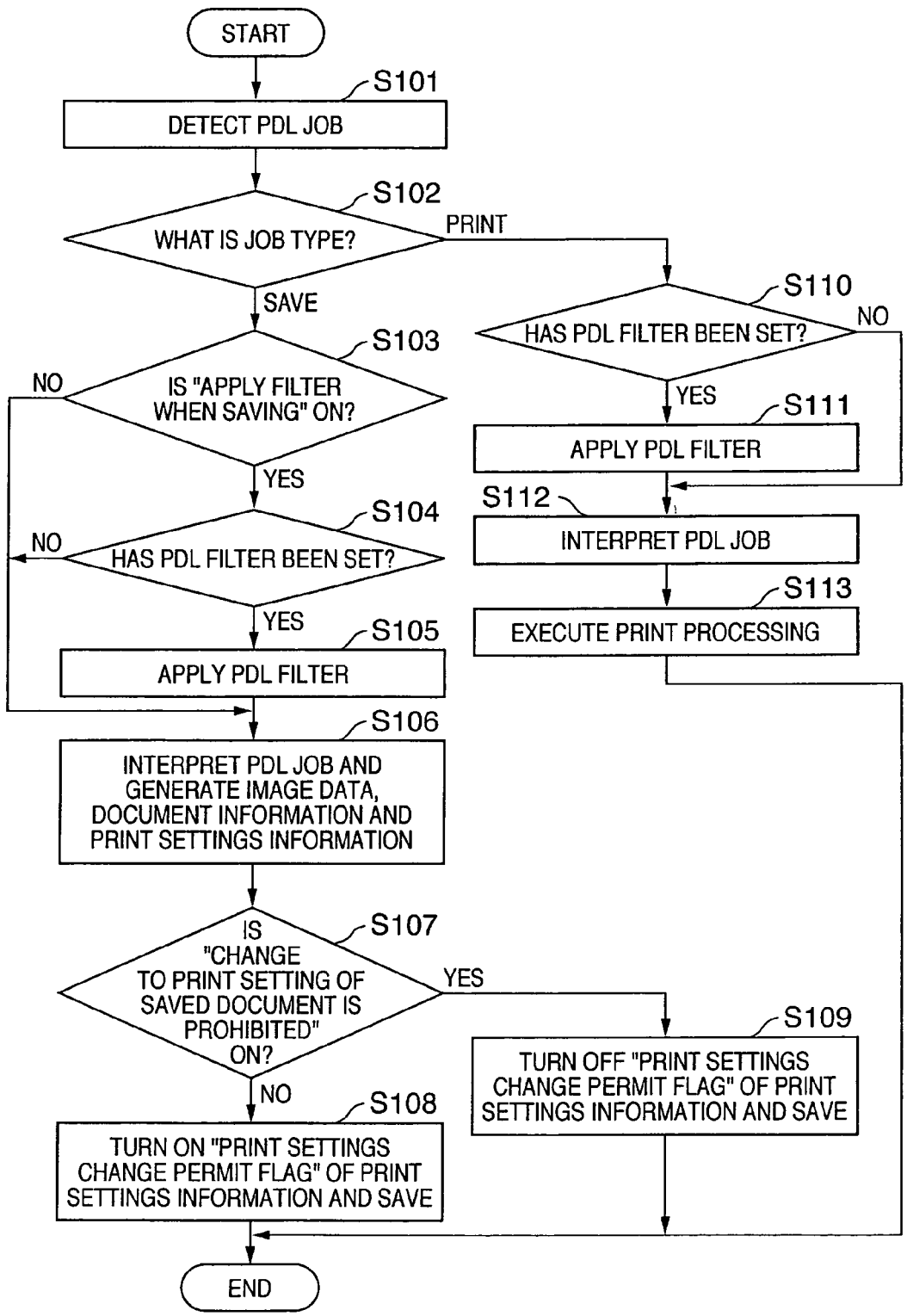
FIG. 9 is a flowchart illustrating operation in an MFP according to the first embodiment when a PDL job is received.

FIG. 9 is a flowchart illustrating operation when a PDL job from the client device 102 is received by the MFP 101 of this embodiment.

The MFP 101 detects receipt of the PDL job through the network device 209 at step S101. Next, at step S102, the MFP 101 determines whether the output method of the received PDL job is "PRINT" or "BOX SAVE". Control proceeds to step S103 if the output method is "BOX SAVE".

The MFP 101 determines at step S103 whether "APPLY FILTER WHEN SAVING" has been set to ON or OFF. The ON or OFF setting of "APPLY FILTER WHEN SAVING" is performed by operating the button 402b in the manner described above with reference to FIG. 4B. If "APPLY FILTER WHEN SAVING" is ON, control proceeds to step S104 and the MFP 101 determines whether a PDL filter for changing the state of the PDL job has been set in the PDL interpreter 208. If it is determined at step S104 that the PDL filter has been set, then control proceeds to step S105. Here the MFP 101 applies the filtering function to the received PDL job and changes the state of the PDL job. In this embodiment, it is assumed that the PDL-job print setting is forcibly made double-sided printing by applying the filtering function. It should be noted that if "APPLY FILTER WHEN SAVING" is OFF or if the PDL filter has not been set, step S105 is skipped and control proceeds to step S106.

At step S106, the PDL interpreter 208 converts the PDL job to an image, extracts document information and print settings information from various information that has been set in the PDL job and generates the document 503 illustrated in FIG. 5. It should be noted that information in accordance with print settings information is generated when the PDL job is converted to an image. By way of example, if 2-in-1 has been set by the print settings information, the document image 511 (FIG. 5) in which images of two pages are arrayed on one page is generated and stored in the document storage area.

Next, at step S107, the MFP 101 determines whether the setting of "CHANGE TO PRINT SETTING OF SAVED DOCUMENT IS PROHIBITED" in the MFP 101 is ON or OFF. In this embodiment, "CHANGE TO PRINT SETTING OF SAVED DOCUMENT IS PROHIBITED" is set to ON or OFF using the user interface (button 402*a*) shown in FIG. 4B, as described above.

If it is determined that "CHANGE TO PRINT SETTING OF SAVED DOCUMENT IS PROHIBITED" is ON, then control proceeds from step S107 to step S109, the MFP 101 sets a flag 513*a* (FIG. 5), which indicates that a change to print settings is permitted, to the OFF state indicating that the change is prohibited and saves the document created at step S104 in the document storage area. Further, if it is determined at step S107 that "CHANGE TO PRINT SETTING OF SAVED DOCUMENT IS PROHIBITED" is OFF, this means that a change in print settings is permitted. Accordingly, control proceeds to step S108. Here the flag 513*a* indicating that a change to print settings is permitted is set to ON and the document created at step S104 is saved in the document storage area. The document (503) thus generated is moved from the document storage area to the designated box in the document management area 501, where the document is saved. It is assumed that the box that is the save destination is specified by the PDL job. Storage of the job by the box function is thus achieved.

On the other hand, if it is found at step S102 that the received PDL job is a "PRINT" job, then control proceeds to step S110. The processing of steps S110 and S111 is similar to that of steps S104 and S105 described above and a PDL filter is applied in accordance with the setting of the PDL filter. Next, at step S112, the PDL job is interpreted and information indicated in document 503 is generated and held in a manner similar to that at step S106. Then, at step S113, the job is printed from the printing apparatus 206 and the generated document (503) is deleted from the document storage area following the end of printing.

Figure 10:
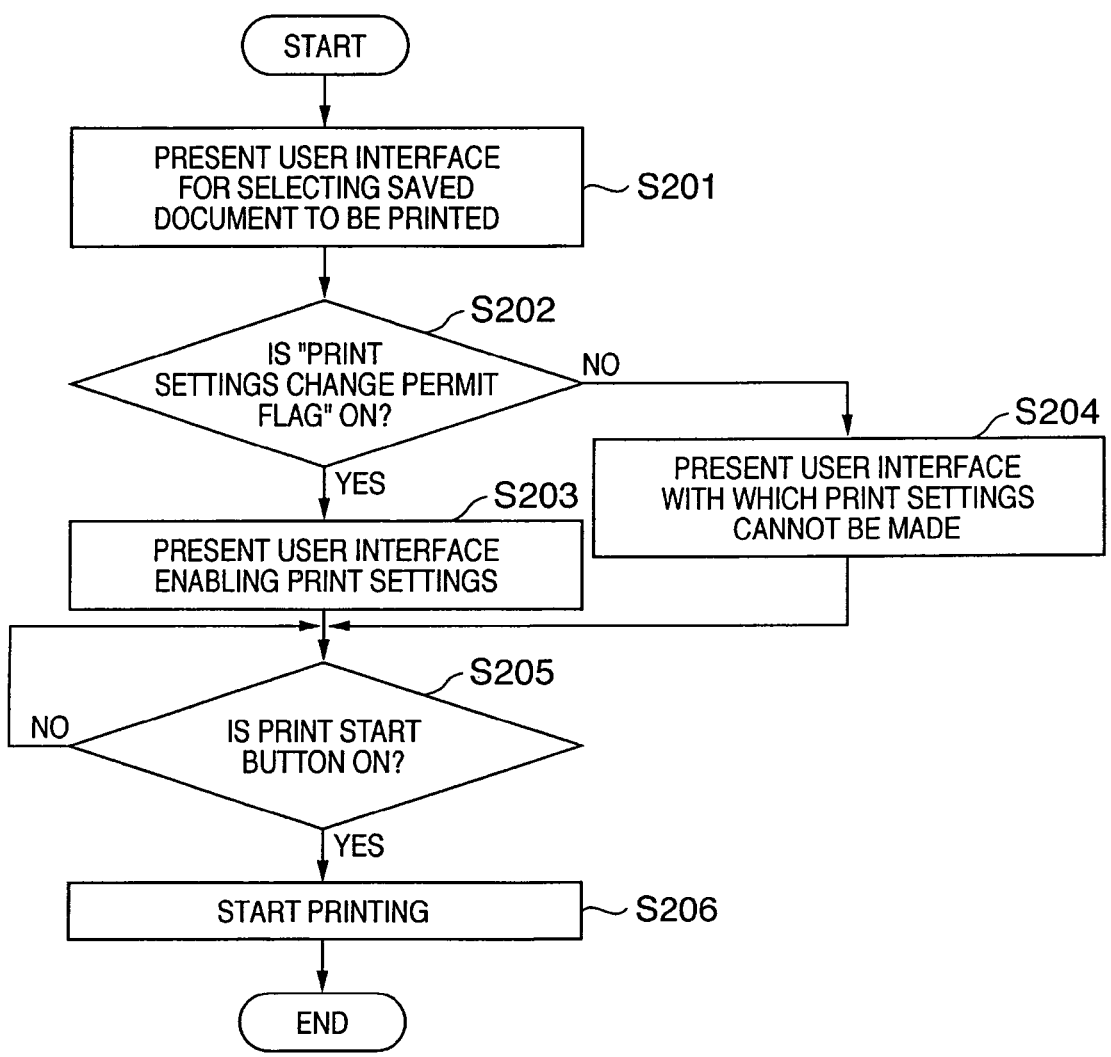
FIG. 10 is a flowchart illustrating operation in an MFP according to the first embodiment when a saved document is printed.

Next, reference will be had to the flowchart of FIG. 10 to describe processing in the MFP 101 in a case where a job that has been saved by the box function is printed.

If a command to print a document that has been stored in a box is issued by operating the input unit 204, a user interface for selecting the box is displayed. When the desired box is selected, the documents that have been stored in the selected box are displayed in list form and the user is allowed to select the desired document (step S201). For example, a user interface of the kind shown in FIG. 13A containing a list section 1301 is presented. In the example of FIG. 13A, a state in which a box referred to as a "USER BOX" has been selected is indicated. If a document to be printed is selected from the list of documents displayed in list section 1301 and a print button 1304 is pressed, then the state of the flag 513*a* indicating that a change to the print settings of the document is permitted is checked at step S202.

If the flag 513*a* is ON, control proceeds to step S203 and a user interface that makes it possible to change the print settings is displayed. For example, a user interface that enables operation of the print-settings change button 601 is presented, as illustrated in FIG. 6A. By operating the print-settings change button 601, the user is allowed to display a print-settings change screen (not shown) and can change the print settings of the document. On the other hand, if the flag 513*a* indicating that a change to the print settings of the document is permitted is OFF, then control proceeds to step S204 and a user interface in which print settings cannot be changed is displayed. For example, an interface in which the print-settings change button 601 cannot be operated is presented, as illustrated in FIG. 6B.

Thus, in accordance with the flag set at step S106 or S107 indicating that a change to the print settings of the document is permitted, the MFP 101 changes over the print dialog box displayed on the display unit 203. That is, if the flag indicating permission to change the print settings of the document has been set to indicate that the change is permitted, then, by displaying the print-settings change button 601 as shown in FIG. 6A, the user can change the print settings of the saved job and print the job. If the flag indicating permission to change the print settings of the document has been set to indicate that the change is prohibited, then the print-settings change button is not displayed, as illustrated in FIG. 6B, thereby so arranging it that the print settings of the save job cannot be changed by the user.

Thus, in accordance with the first embodiment, as described above, whether or not a PDL filter is to be applied can be set when a PDL job is saved by a box function. Further, when a saved job that has been saved by a box function is printed, a change to the print settings on the side of the MFP can be permitted or prohibited and a restriction can be imposed upon the output processing function.

It should be noted that although the foregoing embodiment sets whether print settings are allowed to be changed or not as the restriction on the output processing function, the present invention is not limited to such an arrangement. For example, it may be so arranged that a change can be prohibited in units of more detailed print setting items (e.g., a designation of double-sided/single-sided printing). Further, an arrangement may be adopted in which output by printing or output by transmission per se is prohibited, as will be described below in a second embodiment of the invention.

Second Embodiment

In the first embodiment, whether a change in the print settings of a saved job (a job saved by the box function) is permitted or prohibited is set on the side of the MFP 101. In a second embodiment, an example in which this setting is made on the side of the client device will be described. In the second embodiment, the above-described setting (prohibition of a change in print settings and prohibition of application of a filter when a document is saved) is implemented by setting a restriction on saved-job operation on the side of the client device 102. It should be noted that operability is improved by making it possible to further set "PRINTING PROHIBITED" and "TRANSMISSION PROHIBITED" of a saved job as restrictions on saved-job operation.

As in the first embodiment, the client device 102 acquires device information concerning the MFP 101 before a PDL job Is introduced to the MFP 101. This is carried out in response to the user pressing the device-information acquire button 702 in the settings dialog box 701 displayed on the side of the client device 102 in FIG. 7. If the device information is acquired by SNMP, for example, then the print settings dialog box 801 shown in FIG. 8 is displayed on the display unit of the client device 102. The user employs the print settings dialog box 801 to perform a print setting and introduces the PDL job to the MFP 101. The fact that a setting that is prohibited by the MFP 101 cannot be selected at this time is as described above in conjunction with the first embodiment. Further, if a "SAVED-DOCUMENT PROHIBITED OPERATION" button 804 in FIG. 8 is clicked, then a saved-job prohibited-operation dialog box 1101 illustrated in FIG. 11 is displayed. By employing the saved-job prohibited-operation dialog box 1101, the user can set a restriction (a prohibited operation) on operation in the MFP in a case where a PDL job has been made a saved Job.

FIG. 11 illustrates the saved-job prohibited-operation dialog box 1101 displayed at the client device of the second embodiment when a PDL job is introduced to the MFP. As shown in FIG. 11, the dialog box 1101 makes it possible to set "PROHIBIT CHANGE OF PRINT SETTINGS", "PROHIBIT APPLICATION OF FILTER WHEN SAVING", "PROHIBIT PRINTING" and "PROHIBIT TRANSMISSION" with regard to a saved job. These prohibited operations set by the dialog box 1101 are appended to the PDL job as prohibited-operation information and are sent to the MFP 101 together with the job.

The operation of the MFP 101 that has received this PDL job is substantially similar to that of the first embodiment (FIG. 9). However, the determination at step S103 as to whether "APPLY FILTER WHEN SAVING" is permitted or not is made taking the PDL-job prohibition information into consideration as well. That is, if "PROHIBIT APPLICATION OF FILTER WHEN SAVING" has been set by the PDL-job prohibition information, or if "APPLY FILTER WHEN SAVING" has been set to OFF by the user interface of FIG. 4B at the MFP 101, then it is judged that "APPLY FILTER WHEN SAVING" is prohibited. Similarly, the PDL-job prohibition information is referred to also in the determination concerning "CHANGE TO PRINT SETTING OF SAVED DOCUMENT IS PROHIBITED" at step S107. That is, if "PROHIBIT CHANGE OF PRINT SETTINGS" has been set by the PDL-job prohibition information, or if "CHANGE TO PRINT SETTING OF SAVED DOCUMENT IS PROHIBITED" has been set to ON by the user interface of FIG. 4B at the MFP 101, then it is judged that "CHANGE TO PRINT SETTING OF SAVED DOCUMENT IS PROHIBITED" is ON. Furthermore, a print-permit flag 512a and a transmit-permit flag 512b in document information 512 of document 503 in FIG. 5 are set in accordance with the set state of "PRINTING PROHIBITED" and "TRANSMISSION PROHIBITED" in dialog box 1101 of FIG. 11.

Figure 13B:
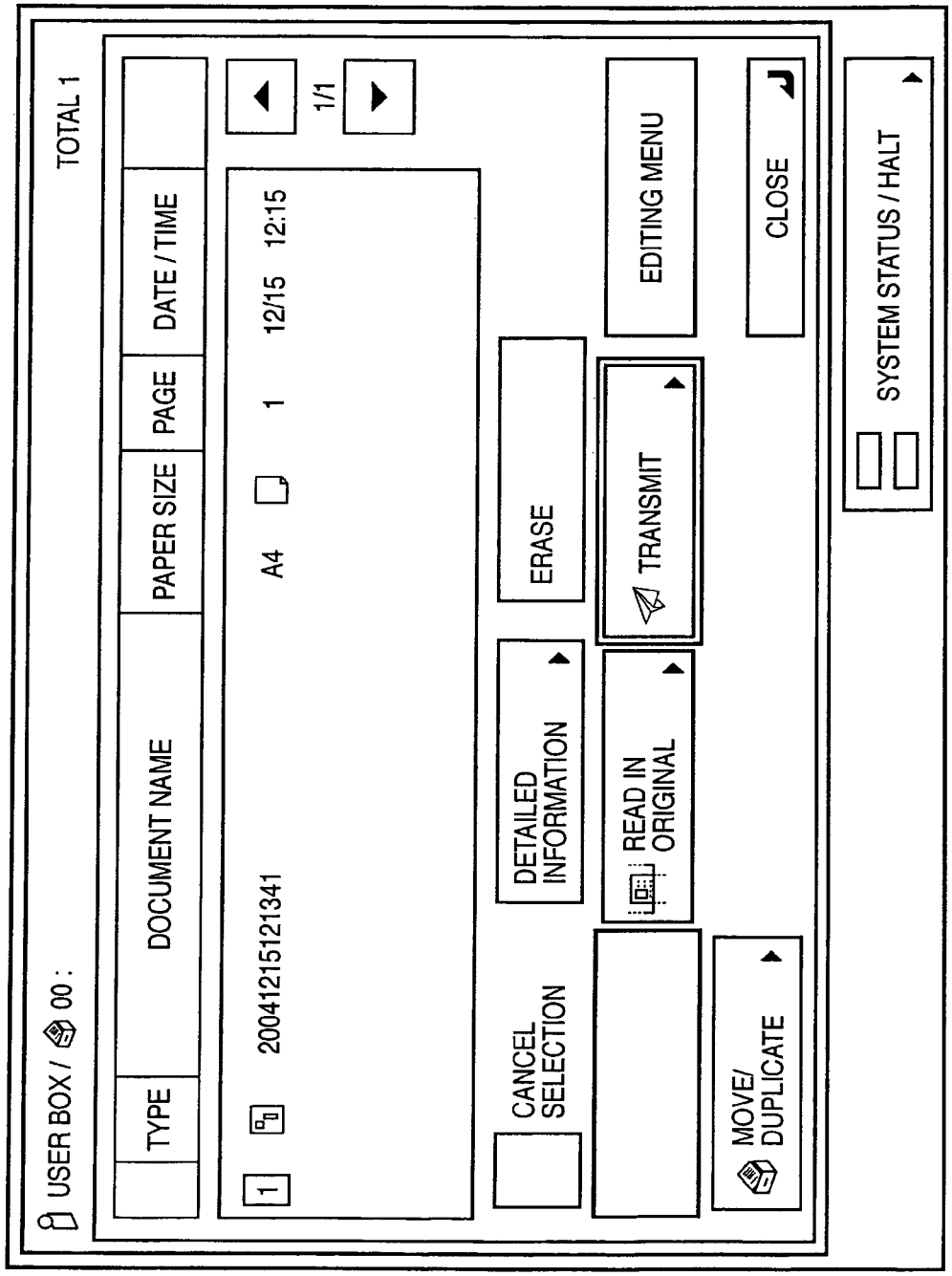
Figure 13C:
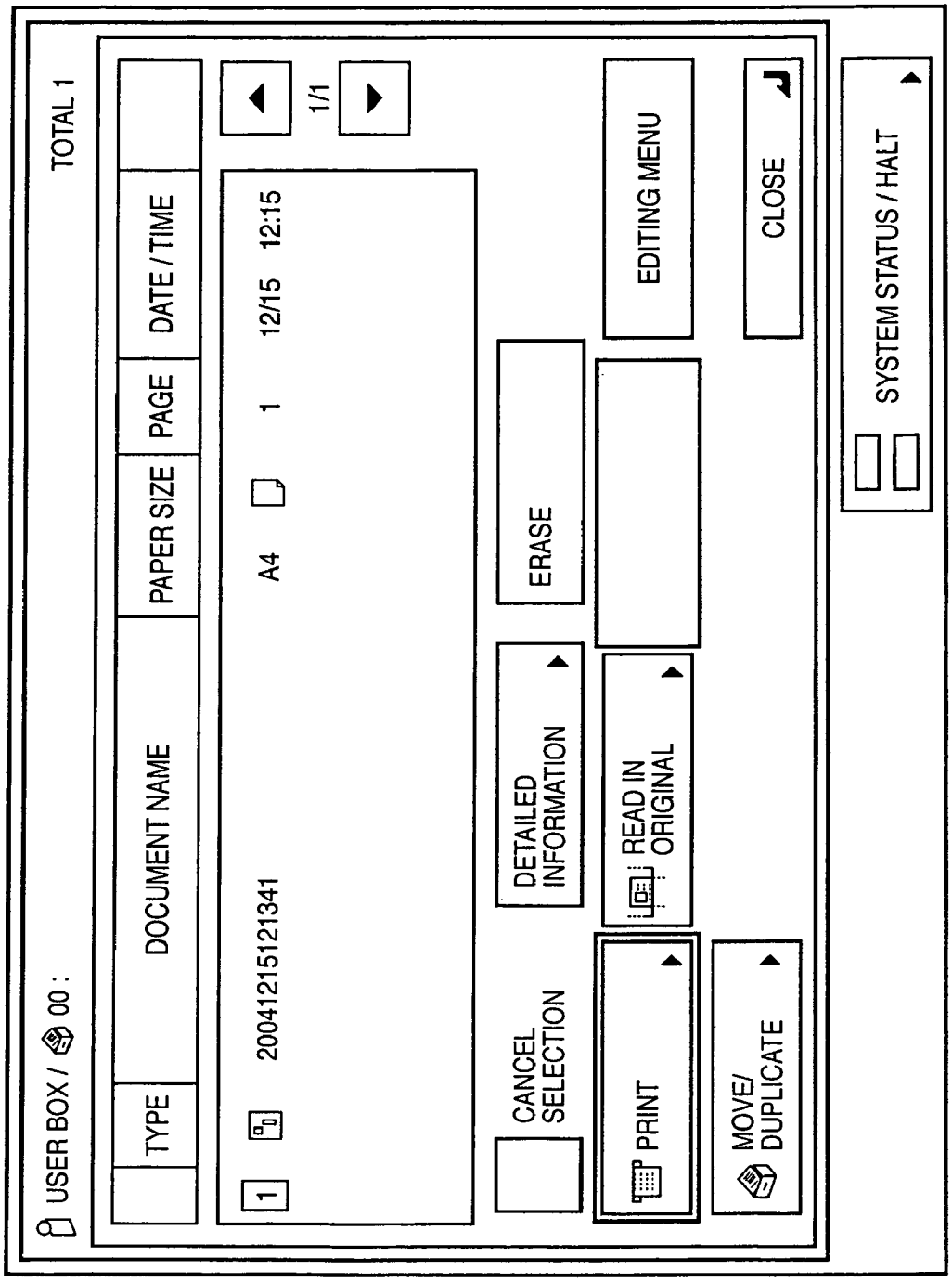

FIG. 12 is a flowchart useful in describing processing for printing a saved document in the MFP 101 according to the second embodiment. Further, FIGS. 13A to 13C are diagrams illustrating an example of a user interface at the time of processing for outputting a saved document in the MFP of the second embodiment.

If a command to execute processing for outputting a saved document is issued by a prescribed operation, a user interface (not shown) for selecting a box is displayed at step S1201. If the desired box is selected, control proceeds to step S1202. Here an interface for displaying the documents in the selected box as a list and for allowing the user to select a document is displayed. For example, a document held in the selected box (a box referred to as "USER BOX" has been selected in FIG. 13A) is displayed in the list section 1301, as illustrated in FIG. 13A. If all documents cannot be displayed in the list section 1301, the list can be scrolled by operating up and down keys 1302 and 1303, respectively.

If a desired document is designated from the list section 1301, control proceeds from step S1203 to step S1204, where the user interface is changed in accordance with the print-permit flag 512a and transmit-permit flag 512b concerning the designated document. For example, if the print-permit flag 512a is OFF, then the print button 1304 is not displayed, as illustrated in FIG. 13B, and printing of the designated document can no longer be carried out. Further, if the transmit-permit flag 512b is OFF, then a transmit button 1305 is not displayed, as shown in FIG. 13C, and transmission of the job can no longer be carried out. If the print-permit flag and transmit-permit flag concerning a document of a selected saved job are both ON, then a user interface that makes it possible to operate both the print button 1304 and transmit button 1305 is presented, as illustrated in FIG. 13A.

If a document for which the print-permit flag 512a is ON has been selected and the print button 1304 has been pressed, then control proceeds from step S1205 to step S1207 and processing from step S202 onward in FIG. 10 is executed. Accordingly, changeover of the user interface as described above with reference to FIGS. 6A and 6B is performed in accordance with the ON/OFF status of the flag indicating that a change to the print settings of the document is permitted. Further, if a document for which the transmit-permit flag is ON has been selected and the transmit button 1305 has been pressed, then control proceeds from step S1206 to step S1208 and processing for transmitting this job is executed at step S1209 through the operation for setting the transmission destination. Examples of transmit processing are facsimile transmission using the facsimile unit 211 and e-mail transmission using the network device, in accordance with the setting of transmission destination.

Thus, in accordance with the second embodiment, as described above, it is possible for the client device 102 that generates and issues a PDL job to set a restriction on operation when the PDL job is saved. The setting, on a per-job basis, of a restriction on processing relating to saved jobs is facilitated and operability is enhanced.

Although the foregoing embodiment illustrates an example in which a prohibition on printing of a saved job or a prohibition on transmission of a saved job is set at a client device, it may be so arranged that these settings can be made on the side of the MFP. In such case the user can be allowed to set the prohibition on printing or transmission of a saved job by an interface similar to that illustrated in FIG. 4B.

Further, the second embodiment takes into consideration the content of a restriction that has been set by the user interface of FIG. 4 at the MFP 101. However, it is permissible to adopt an arrangement in which only prohibition information from the client device 102 is taken into account.

Further, in the second embodiment, the arrangement is such that if the client device imposes a restriction for when a saved job based upon a box function is generated, stored and output, the restriction is appended to a PDL job as prohibition information. However, this does not limit the present invention. For example, a setting may be made by communication other than PDL job transmission between a client device and an MFP.

Thus, in accordance with each of the embodiments described above, a change in the print settings of a job from a user interface on a multifunction peripheral can be prohibited in cases where the job received by the multifunction peripheral is a saved job. As a result, a printed result that is in line with the intentions of the administrator can be output in a printing environment that employs a filtering function, by way of example. Further, besides cases where a filtering function is used, if a job that a user has set and generated at a client device is a saved job, another user cannot make different settings at a multifunction peripheral. As a result, a printed result that is in line with the intentions of the user who generated the job can be output.

Further, there are cases where the object of the invention is attained also by supplying software programs (programs corresponding to the flowcharts of the foregoing embodiments), which implement the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the programs, the form of the programs, e.g., object code, a program executed by an interpreter or print data supplied to an operating system, etc., does not matter.

Examples of recording media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the programs, the client computer can be connected to a website on the Internet using a browser possessed by the client computer, and the computer programs per se of the present invention or an automatically installable compressed file of the programs can be downloaded to a recording medium such as a hard disk. Further, the programs of the present invention can be supplied by dividing the program code constituting the programs into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the programs of the present invention on a storage medium such as a CD-ROM, distribute the storage medium to users, allow users who meet certain requirements to download decryption key information from a website via the Internet, and allow these users to run the encrypted programs by using the key information, whereby the programs are installed in the user computer.

Furthermore, besides the case where the aforesaid functions according to the embodiments are implemented by executing the read programs by computer, an operating system or the like running on the computer may perform all or a part of the actual processing so that the functions of the foregoing embodiments can be implemented by this processing.

Furthermore, after the program read from the recording medium is written to a memory provided on a function expansion board inserted into the computer or in a function expansion unit connected to the computer, a CPU or the like mounted on the function expansion board or function expansion unit performs all or a part of the actual processing so that the functions of the foregoing embodiments can be implemented by this processing.

Thus, in accordance with the present invention as described above, it is possible to impose a restriction upon processing of a saved job (namely processing when the job is saved and/or output) and to so arrange it that an output in line with the intentions of the user can be realized when a saved job is output.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-118976, filed on Apr. 15, 2005, which is hereby incorporated by reference herein in its entirety.

What is claimed is:

1. A printing apparatus comprising:
    a first designation unit constructed to accept a user's designation indicative of whether or not a filter is applied to a print job to be saved, wherein the filter forcibly applies a print setting to the print job;
    a second designation unit constructed to accept a user's designation indicative of whether or not print settings change of the print job is permitted;
    an applying unit constructed to forcibly apply the print setting of the designated filter if said first designation unit accepts the user's designation indicating that the filter is applied, such that a filtered print job is output, and to not forcibly apply the print setting of the designated filter if said first designation unit accepts the user's designation indicating that the filter is not applied;
    a saving unit constructed to save the filtered print job output from said applying unit with permission of print settings change if said second designation unit accepts the user's designation indicating that print settings change is permitted, and to save the filtered print job output from said applying unit with inhibition of print settings change if said second designation unit accepts the user's designation indicating that print settings change is not permitted;
    a changing unit constructed to, when outputting the print job saved by said saving unit, provide a user interface that allows a user to change print settings if the print job is saved with the permission, provide a user interface that does not allow a user to change print settings if the print job is saved with the inhibition, and change print settings of the print job when print settings are changed via the user interface; and
    a printing unit constructed to print the print job saved by said saving unit if print settings have been not changed by said changing unit and to print the print job whose print settings have been changed by said changing unit if print settings have been changed by said changing unit.

2. The apparatus according to claim 1, further comprising a notification unit constructed to notify a host computer, which sends the print job, that the filter is applied to a print job and is accepted by said first designation unit, such that the host computer displays a print setting screen in which a print method is fixed to double-sided print.

3. The apparatus according to claim 1, wherein the host computer is constructed to set, for the save job, prohibition of printing, prohibition of change of print setting, prohibition of transmission and/or prohibition of application of filer when saving.

4. A control method for a printing apparatus comprising:
    a first designation step of accepting a user's designation indicative of whether or not a filter is applied to a print job to be saved, wherein the filter forcibly applies a print setting to the print job;
    a second designation step of accepting a user's designation indicative of whether or not print settings change of the print job is permitted;
    an applying step of forcibly applying the print setting of the designated filter if said first designation step accepts the user's designation indicating that the filter is applied, such that a filtered print job is output, and not forcibly applying the print setting of the designated filter if said first designation step accepts the user's designation indicating that the filter is not applied;

a saving step of saving the filtered print job output by said applying step with permission of print settings change if said second designation step accepts the user's designation indicating that print settings change is permitted, and saving the filtered print job output by said applying step with inhibition of print settings change if said second designation step accepts the user's designation indicating that print settings change is not permitted;

a changing step of, when outputting the print job saved by said saving step, providing a user interface that allows a user to change print settings if the print job is saved with the permission, providing a user interface that does not allow a user to change print settings if the print job is saved with the inhibition, and changing print settings of the print job when print settings are changed via the user interface; and a printing step of printing the print job saved by said saving step if print settings have been not changed by said changing step and printing the print job whose print settings have been changed by said changing unit if print settings have been changed by said changing step.

5. The method according to claim 4, further comprising a notification step if notifying a host computer, which sends the print job, that the filter is applied to a print job and is accepted by said first designation step, such that the host computer displays a print setting screen in which a print method is fixed to double-sided print.

6. The method according to claim 4, wherein the host computer is constructed to set, for the save job, prohibition of printing, prohibition of change of print setting, prohibition of transmission and/or prohibition of application of filer when saving.

* * * * *